Figure 1:
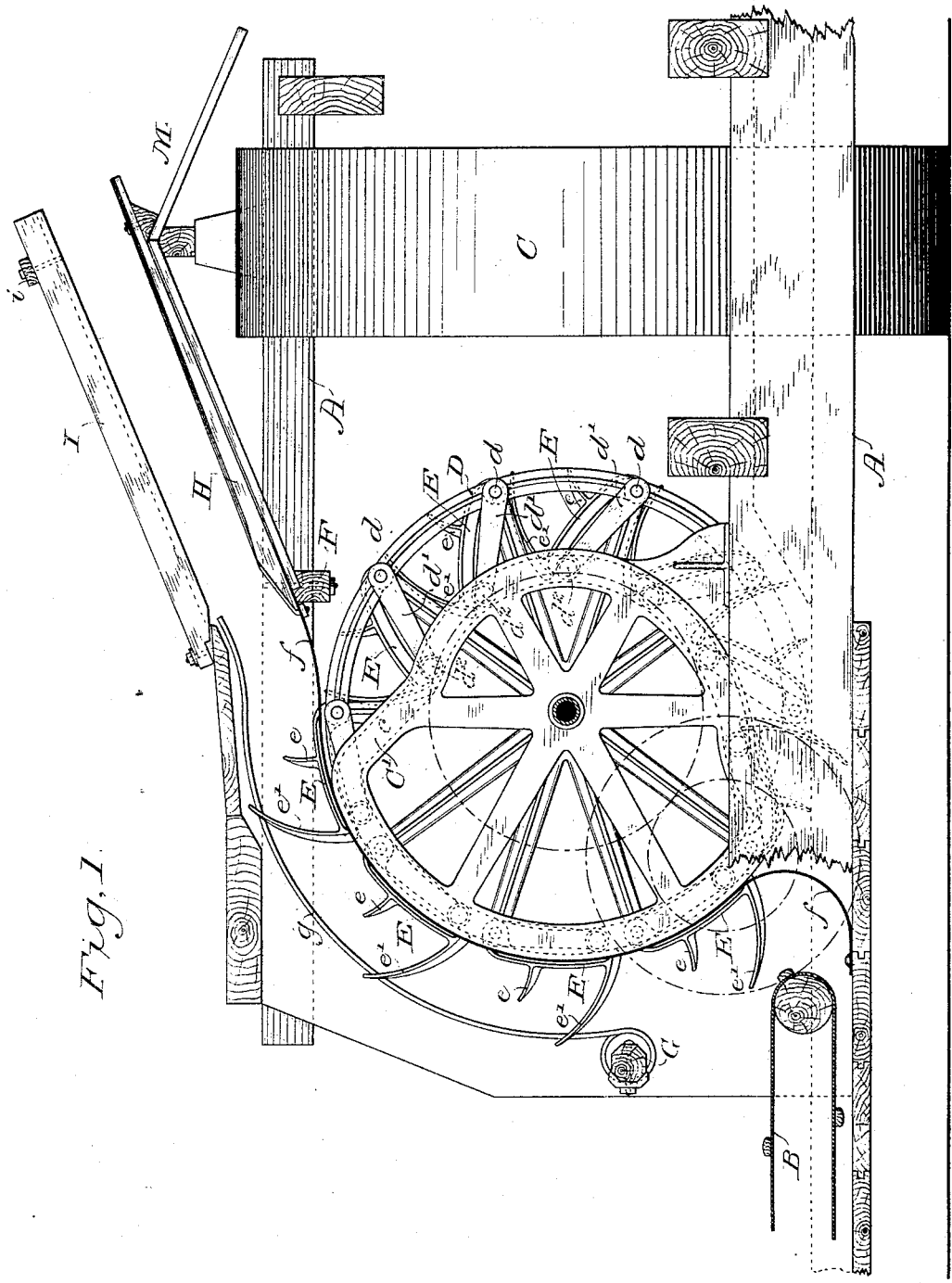

(No Model.) 3 Sheets—Sheet 1.

W. R. BAKER.
GRAIN BINDING HARVESTER.

No. 342,165. Patented May 18, 1886.

WITNESSES
Wm A. Skinkle
Edwin A. Neuman

INVENTOR
William R. Baker.
By his Attorneys.
Parkinson & Parkinson

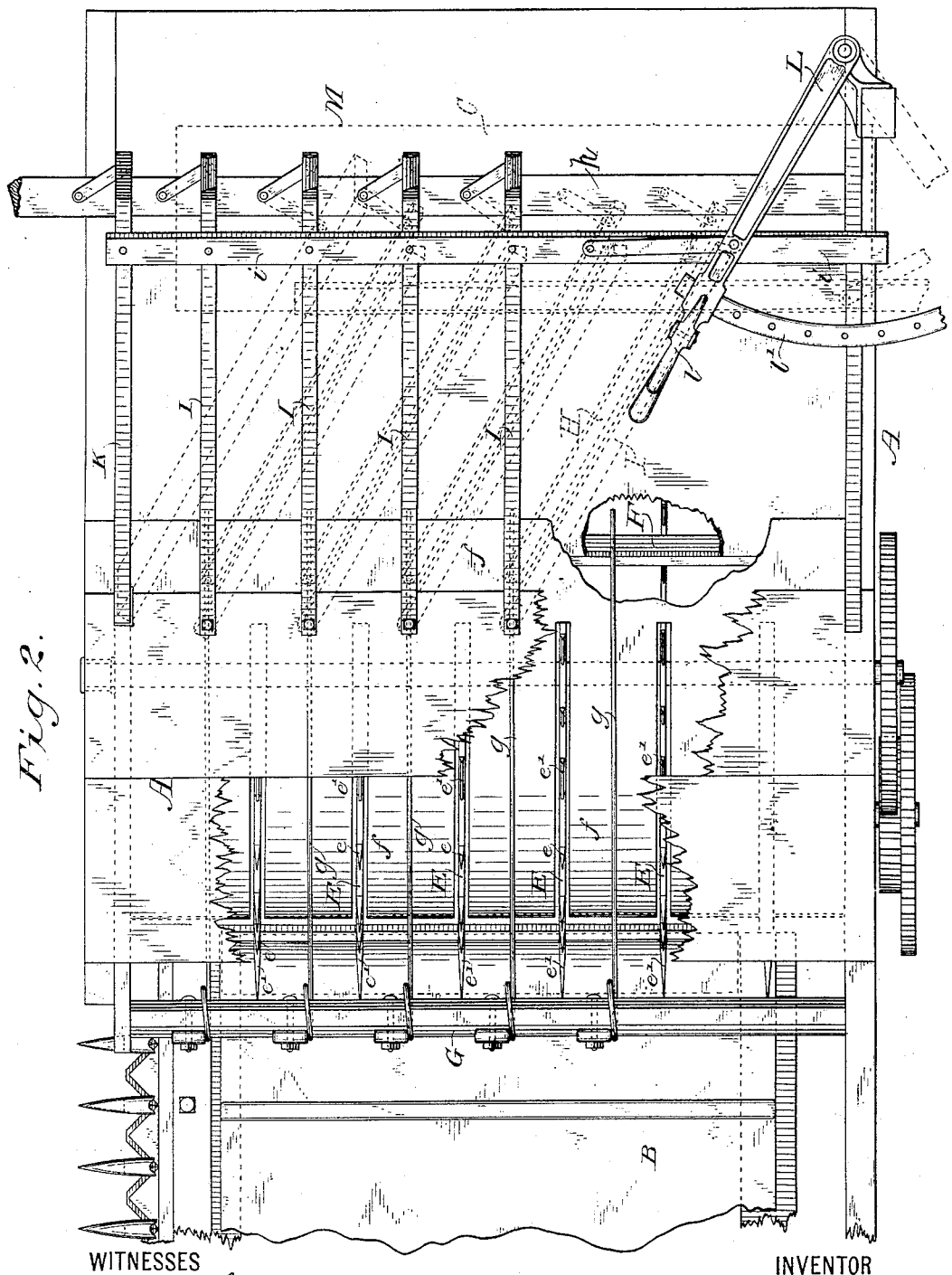

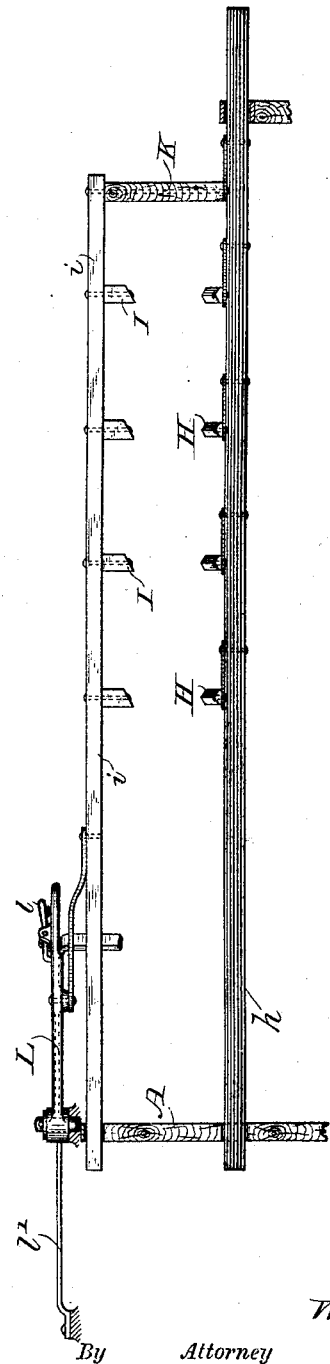

UNITED STATES PATENT OFFICE.

WILLIAM R. BAKER, OF CHICAGO, ILLINOIS.

GRAIN-BINDING HARVESTER.

SPECIFICATION forming part of Letters Patent No. 342,165, dated May 18, 1886.

Application filed August 11, 1884. Serial No. 140,260. (No model.)

*To all whom it may concern:*

Be it known that I, WILLIAM R. BAKER, of Chicago, in the county of Cook and State of Illinois, have invented certain new and useful Improvements in Grain-Binding Harvesters, of which the following is a specification.

It is well-known that grain in the field grows to different heights, according to the nature of the soil or the amount of moisture accessible to it; and in binding by automatic mechanism it has been found necessary to supply means whereby the stalks may be shifted endwise a greater or less distance, according to their length, to cause the binding-arm to place the band around their center or at the proper point for making a good sheaf, or else to shift said binding-arm and the band-securing mechanism relatively to the length of the stalks for the same purpose. Among other expedients, an apron has been used, acting upon the butts of grain, the roller at that end of the apron which they first struck being relatively stationary, and at the other end movable in and out toward and from the binding-arm. Another, and the first in point of time, was to make the elevator-belts, of which there was a series, movable laterally at the top, that the grain as it was carried up might be displaced longitudinally of its length; and still another was to slide the binding-table and the binding apparatus mounted thereon bodily along the elevator or along the delivery side of the harvester while maintaining the mechanism in gear with some driven part.

The object of my invention is to accomplish the same end by still other and novel means; and it consists in combining with packing or forcing mechanism at the stubble end of the harvester a series of guide bars or slats, between which the grain is impelled, hinged at their ends nearest said forcing apparatus and movable at their converse ends, whereby grain passing between their quiescent opposing surfaces will be guided in this direction or that to bring the proper point in its length beneath the binding-arm; in combining with a harvester having an elevator at the inner or stubble end of its platform elevating and forcing devices receiving the grain from the platform-apron and carrying it up, and series of guide bars, ribs, or slats at the head of said active elevating mechanism, pivoted at their ends nearest thereto and movable at their other ends, to guide, direct, and compact the grain by their frictional contact with it as it is forced along their length; in combining with the platform-apron an elevator wheel or drum carrying rock-shafts oscillated by crank-arms at one end of each, taking into a cam way or track, and tooth-bars fixed to said rock-shaft at intervals and bearing teeth of length increasing with the distance from the axis, and in the various other combinations and details of constructions hereinafter pointed out and claimed.

In the drawings, Figure 1 is a rear elevation, partly in section, of so much of a harvesting-machine embodying my invention as is necessary to an intelligent understanding thereof. Fig. 2 is a top plan view, and Fig. 3 is a detail of the shifting devices.

A is a portion of the harvester-frame, B the platform-apron exposed by breaking away the rear sill, and C the main wheel. The binding-table and automatic binding mechanism it is not deemed necessary to show. As represented, these exhibited parts are components of a machine wherein the delivery is elevated—that is, over the head of the main wheel.

With proper modification it will be understood that so far as the operation of the shifting devices hereinafter described is concerned the harvester may be of the type known as "low-level," packers of suitable form for the purpose, carrying the grain horizontally, or substantially so, from the platform-apron into the throatway of the shifter, or else a platform-rake being employed of such construction as itself to properly deliver directly into said shifter and force the grain therethrough.

The arrangement herein described is therefore mainly for the purpose of explaining one form in which the invention may be developed, and, incidentally, the novel elements which may enter into its construction. At the inner or stubble end of the platform, then, is located an elevating and packing device adapted to carry the grain up from the receiving-point and force it positively along as it accumulates at the discharge-point. Such elevating mechanism may, if desired, consist of endless chains carrying folding or knuckling teeth, which remain erect or at right angles to the plane of the chain so long as they are forcing the grain forward, and fold back at the moment they are to be withdrawn from it; or it may be and herein is shown as consisting of a drum, D, either skeleton or slotted circumferentially at regular intervals, and carrying in its periphery rock-shafts $d$, from one end of which project crank-arms $d'$, having pins or rollers $d^2$, which take into a cam-track, $c$, in a plate, C, bolted fast to one of the sills, preferably the rear sill, and, as they follow said cam-track, cause the shafts to oscillate in their bearings. Upon these shafts, at every point where they cross a slot in the drum, or at regular intervals, are fixed curved arms E, having teeth $e$ and $e'$, the first being low, and the second or successive rear teeth of such increasing length that when the arms drop beneath the periphery of the drum their points will simultaneously come flush therewith.

Stripping-bands $f$ are fixed at one end to the flooring of the platform and at the other end to one of the cross-timbers, F, connecting the upper front and rear bars of the elevator-frame above the drum, being curved intermediately to correspond to the contour of said drum, and to another cross-bar, G, above the delivery end of the platform-apron, are fastened the lower ends of spring-float or presser-rods $g$, also curved to correspond, substantially, to the periphery of the drum, but set out at a distance therefrom, such that the ends of the longer teeth only pass beyond them when fully projected, and at the upper ends these presser-rods are free, so as to yield elastically. In order to lift the grain from contact with the stripper-bands as it is carried up by the teeth the curved arms upon which these teeth are mounted are of such contour and so controlled by the cams at the ends of their respective shafts that as they pass up along that portion of the bands parallel with the arc described by said shafts in the revolution of the drum they set out from the surface of the bands sufficiently throughout their entire length to act as ribs as well as carriers. Now, as the drum revolves, the cam-track, starting from a point opposite the inner end of the platform-apron, is described on an arc concentric with its periphery, and is preferably flush therewith, and it acts upon the crank-arms in such manner that the teeth are held up, the tooth-bars being parallel with the surface of the drum until they have reached, substantially, the limit of their upward movement and are ready to start upon their descent. At this moment the track re-enters obliquely inward and causes said teeth to be retracted from the grain until their ends have been brought flush with the periphery of the drum. Then the track again becomes concentric with the periphery, but at a sufficient distance therewithin to hold the teeth fixed in their withdrawn position. At the moment, however, that they are approaching the inner end of the platform-apron the track first flares easily outward to project them partially, and then, when they are sufficiently past the flooring of the platform, becomes more abrupt, to swing them quickly to the full extent of their outward movement to enter the grain.

To the same cross-timber which supports the upper end of the stripper-bands, or else to one immediately adjacent thereto, are pivoted a series of parallel guide-slats, H, ascending to a point over the wheel, where they are connected by links with a sliding bar, $h$, so that they may be swung upon their pivotal points while maintaining their parallelism with each other. The upper edges of these slats are beveled from each side, as shown, so as to catch into the grain and guide it. A second opposing series of slats, I, are pivoted to the plank or foot-board above the elevating-drum and at point above the pivots of the first. These latter slats ascend parallel with the first, and at a sufficient distance from them to form a narrow throatway for the grain to a point also overhead the main wheel, where they are pivoted either directly or by links to a reciprocating bar, $i$, for the same purpose as above. They may be beveled, like the first, from both sides to a central edge, the edges of course opposing the edges of those beneath; but to give them better bite, since they do not have the weight of the grain upon them, it is advisable to bevel them, as shown, from one side to the other. A wind-board, K, at the front of the passage-way thus formed, is pivoted at the lower end on the same line with the pivots of the upper guide-bars, and at the upper end link-connected to the lower sliding bar and secured by a pivotal pin to the upper. A lever, L, hinged to a bracket from one of the rear elevator-posts or from the frame-work, connects by link with the upper reciprocating bar, and by means of a dog, $l$, can be fastened at any point along a segment, $l'$, thus enabling the attendant to swing the upper ends of the guide-slats to one side or the other any desired distance. Now, as grain is delivered by the platform-apron it will be carried up by the elevating mechanism and packed in the entrance between the two sets of swinging slats, and as it accumulates will be forced along their quiescent surfaces sidewise until it reaches their head, when it will fall over upon the grain-chute M and descend to the binding-table, to be encircled and bound.

While the grain continues to be of the proper length, the swinging guide-slats will be held in fixed position parallel with the length of the machine, so that the grain as it travels along them will receive no lateral displacement; but as the length of the grain increases the upper ends of the slats will be swung forward by the attendant, causing it to travel in the direction of the butts toward the front of the machine; or if it become stunted the slats will be swung to the rear, carrying it in the direction of the heads, so that at all times the binder-arm may lay the band around it at the proper point to make the waist of the sheaf. The normal position of the slats may of course be inclined, carrying grain of average length somewhat to the rear and carrying longer grain directly up without displacement, according to the fixed position of the binder-arm. The rational position, however, is that indicated.

One set of the guide-slats may be dispensed with, and a smooth flooring or decking substituted, if so desired, and their number may be greater or less, according to circumstances. It is not intended to fix any determinate number, as the effect will be the same in kind, though not in degree, whether the number is greater or less. They should not, however, be so multiplied as to cause needless friction, or so far dispensed with as to permit the grain to slip and lose their positive effect.

I claim as my invention—

1. The combination, in a grain-binding harvester, of packing and forcing mechanism and a shifter composed of slats or bars pivoted at the receiving ends and adapted to be moved simultaneously to one side or the other at the delivery ends, all arranged in such manner that the packing and forcing mechanism delivers entirely at the receiving ends of said slats and is the sole means by which the grain is forced along the shifter.

2. The combination, in a grain-binding harvester, of mechanism for feeding and forcing or packing the grain, and a grain-shifter composed of two opposing series of slats or bars pivoted at the receiving ends and arranged to be moved simultaneously to one side or the other at the delivery ends, between which series the packing devices force the grain.

3. The combination, in a grain-binding harvester, of a platform-apron, elevating and forcing mechanism which receives the grain from the inner end of said apron and carries it up toward the top of the main wheel, and a grain-shifter to which said packing mechanism delivers, composed of series of parallel bars presenting quiescent bearing-surfaces to the grain, hinged near to the head of the elevating devices and arranged to be moved laterally and simultaneously at the other end, whereby the grain is carried along said shifter entirely by the agency of the forcing or packing mechanism at the receiving end thereof.

4. The combination, in a grain-binding harvester, of a platform-apron, elevating and forcing mechanism, which takes the grain from the inner end of said apron and carries it up, stripper-bands overlying said elevating mechanism, and a series of shifter-slats pivoted at the upper ends of said stripper-bands in such manner that the grain will slide directly upon them as it leaves the bands, arranged to be swung laterally in unison at the ends most remote from their pivots.

5. The combination, in a grain-binding harvester, of a platform-apron, elevating and packing devices which take the grain from the inner end of said apron and carry it up toward the top of the main wheel, stripper-bands overlying said elevating devices, a series of shifter bars or slats pivoted at the upper ends of said stripper-bands, and arranged to be moved laterally in unison at their free ends, float or presser rods between which and the stripper-bands the grain is carried up, and a second series of shifter-slats pivoted at the upper ends of said float-rods, opposing the first series of slats, and adapted to be moved in unison therewith.

6. The combination, in a grain-binding harvester, of the platform-apron, the elevating-drum and its swinging teeth controlled as described, the passage-way, up which it carries the grain, the two sets of pivoted shifter slats or bars, between which it delivers and forces said grain, and means for swinging said slats or bars at their free ends in unison, to cause the grain as it passes between them to be displaced endwise.

7. The combination of the shifter-slats arranged in two series opposing each other, the reciprocating bar to which the slats of the upper series are pivoted at their free or swinging ends, the underlying sliding bar, and the links connecting said sliding bar with the swinging ends of the second or lower series, the lever for moving said bars simultaneously, and the segment into which said lever latches to lock the bars in fixed position.

8. The combination of the pivoted shifter-slats arranged in two opposing series, the pivoted wind-board, the reciprocating bar to which the ends of the slats of the upper series are pivoted, and also the wind-board, the sliding bar link-connected to the swinging end of said wind-board and to the ends of the slats of the lower series, and the lever and its locking-segment.

9. The combination, in a grain-shifter substantially such as set forth, of a lower series of swinging slats having their edges beveled from each side to a central rib, and an upper or opposing series having their edges with but a single bevel from one side to the other.

10. The combination, to form an elevator for grain, of an elevating or packing drum, stripping rods or bands rising from the platform and conforming for a distance to the contour of said drum, a series of rock-shafts journaled in the periphery of the drum, crank-arms from the ends of said rock-shafts, a cam-track receiving rollers from the ends of said crank-arms, and tooth-carrying bars fixed to the rock-shafts at intervals along their length, and curved and arranged upon their respective shafts in such manner that they set out as ribs from the surface of the stripper-bands while passing parallel thereto.

11. The combination, in an elevating or packing drum for grain, of a series of rock-shafts journaled in its periphery, crank-arms from the ends of said rock-shafts, a cam-track receiving rollers from the ends of said crank-arms, and tooth-bars fixed to said rock-shafts at intervals and bearing teeth of length increasing with the distance from the axis.

Witnesses:    WILLIAM R. BAKER.
  WM. L. PRATHER,
  W. S. BAKER.